June 4, 1968    E. E. ALMS    3,386,715
AIR HEATING DEVICES FOR CROP DRYERS AND THE LIKE
Filed April 25, 1966    3 Sheets-Sheet 1

INVENTOR
ERHARD E. ALMS
BY Charles F. Voytech
Atty.

INVENTOR
ERHARD E. ALMS
BY
Charles F. Voytech
Atty.

United States Patent Office 3,386,715
Patented June 4, 1968

3,386,715
AIR HEATING DEVICES FOR CROP DRYERS
AND THE LIKE
Erhard E. Alms, Barrington, Ill., assignor to American Farm Equipment Co., Crystal Lake, Ill., a corporation of Delaware
Filed Apr. 25, 1966, Ser. No. 544,966
6 Claims. (Cl. 263—19)

ABSTRACT OF THE DISCLOSURE

An air heating means for a crop dryer in which a more uniformly heated stream of air is supplied to the dryer by a combined fan, furnace, burner unit and air inlet control device, in which the fan is disposed downstream of the furnace outlet, the burner is substantially coextensive with the furnace inlet, and burner flame length is controlled by an adjustable auxiliary air inlet to the furnace.

---

This invention relates to air heating devices, and it will be described for purposes of illustration as applied to a crop dryer, although it is understood that it may be applied to other uses.

It is frequently necessary to supply large quantities of uniformly heated air to a chamber, either to make the air in the chamber agreeably warm, or to heat products in the chamber as one step in a process. Where warmth is desired, particularly for humans, and the heating medium is a combustible fuel, the air should be free of products of combustion, and the oxygen needed to support combustion should not be taken from the chamber. This generally requires a double-walled furnace with a combustion chamber connected to the atmosphere, and a second chamber, independent of the combustion chamber, in which air is heated by conduction through the walls of the combustion chamber.

In industrial processes, the presence of the products of combustion may not be detrimental to the process, and hence the double-walled combustion chamber can be dispensed with. Uniformity of temperature and flow, however, are usually required of both room heating devices and industrial processing furnaces, as is also maximum efficiency in the conversion of the fuel into heated gases.

In a crop dryer, which may be classed as an industrial heating process, it is desired to supply a chamber with uniformly heated gases which, by contact with and passage through a perforated wall of a grain holding chamber, heat the grain and drive off the moisture in the grain. Excessive heat in the gases is harmful to the grain, and lack of uniformity in the temperature of the gases results in undried grain, which is highly undesirable from the standpoint of ability of the grain to store well. One form of commercially available crop dryer is shown in U.S. Patent No. 3,056,214 to A. Andersen, Jr., dated Oct. 2, 1962. In that dryer, a cylindrical heating unit is provided having a circular outlet for the products of combustion and the latter are led directly to the drying chamber. A circular air inlet opening is provided in axial alignment with the outlet, and a radial blade type of fan is placed at the inlet to draw air through the inlet and force it past a burner located between the fan and the outlet.

Although the efficiency of the Andersen type of dryer has been acceptable, better heat utilization and uniformity of temperature has been found desirable, and it is accordingly an object of this invention to provide an air heating device in which better efficiency of conversion of the fuel to heated gases can be obtained.

A further object of this invention is to provide an air heating device in which air and products of combustion are more thoroughly mixed so that a supply of uniformly heated gases is available for drying crops or other uses.

In the rapid combustion of large quantities of fuel in a relatively small furnace chamber the length of the flame becomes a critical factor, since a very long flame may bring hot gases to some part of the drying apparatus which is not intended to withstand high temperatures. The length of the flame depends upon the pressure differential across the burner which in turn, depends upon several factors, one of which is the kind and condition of the crop being dried. Thus a closely packed, wet grain will interpose more resistance to the passage of hot gases therethrough than a loosely packed relatively dry grain, and hence it is desirable to vary the velocity of the air going to the burner.

Another object of this invention is to provide a means for varying the velocity of air directed across a burner of a crop dryer or the like.

These and other objects of this invention will become apparent from the following detailed description of a preferred embodiment thereof when taken together with the accompanying drawings in which FIG. 1 is an exploded perspective view of the heating device of this invention shown applied to a crop dryer;

FIG. 5 is a fragmentary side elevational view partly in section of the air velocity control device of FIG. 4.

In accordance with the present invention, several factors have been combined which together produce the result of greater efficiency of combustion and uniformity of temperature desired. I have found that if the air is supplied to the burner by placing the burner in the suction side of a blower instead of on the pressure side, the blower then is disposed within the dryer instead of external thereto and the outside noise level of the blower is reduced. I have found further that if a centrifugal type of blower is used, instead of a radial vane type, the outside noise level is still further reduced. More importantly, by placing the blower between the burner and drying chamber, the blower serves as a mixer and thoroughly mixes the products of combustion with the air drawn in by the blower so that greater uniformity of temperature of the air passing through the drying chamber results. A gas burner is used instead of the oil burner furnished with the prior Andersen burner and by shaping the burner to cover a maximum area of the inlet to the combustion chamber, the quantity and stratification of unheated air entering the chamber are materially reduced.

With the intake side of the centrifugal blower disposed at the outlet of the combustion chamber, it is necessary to keep the burner flame out of contact with the impeller of the blower to avoid overheating the bearings and their lubricant. Control of the length of the flame and hence its proximity to the blower is achieved by controlling the size of the air inlet opening at the burner, which in turn controls the velocity of the air across the burner, since the blower is operated at a substantially constant speed. The higher the velocity of the air the shorter the flame.

Figure 1:
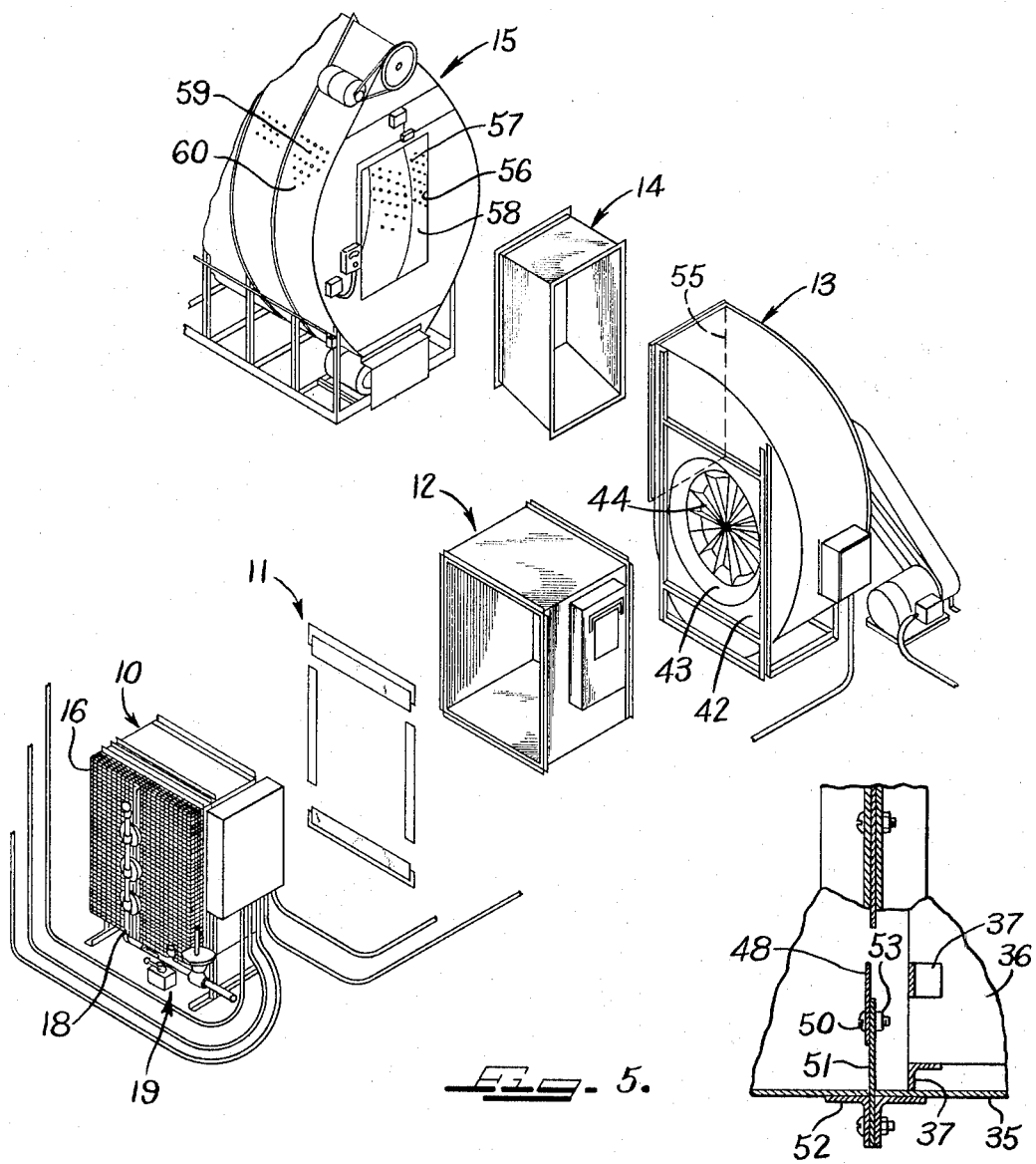

Referring now to FIG. 1 for a more detailed description of the preferred form of the invention depicted therein, the heating device is comprised of a burner portion 10, a velocity control section 11 which is also referred to herein as a profile assembly, a furnace section 12, a blower 13, a transition assembly 14 through which the heated air is transmitted to a grain dryer chamber 15. Burner section 10 has a screen 16 at its entrance end to protect operating personnel, animals, etc., from contact with the burner and to keep the larger floating debris from being drawn into the burner. It is preferably made of one inch square mesh wire screen formed into a box-like structure which is then welded to an angle iron frame 17 (FIG. 2) bolted to the burner section 10.

Figure 2:
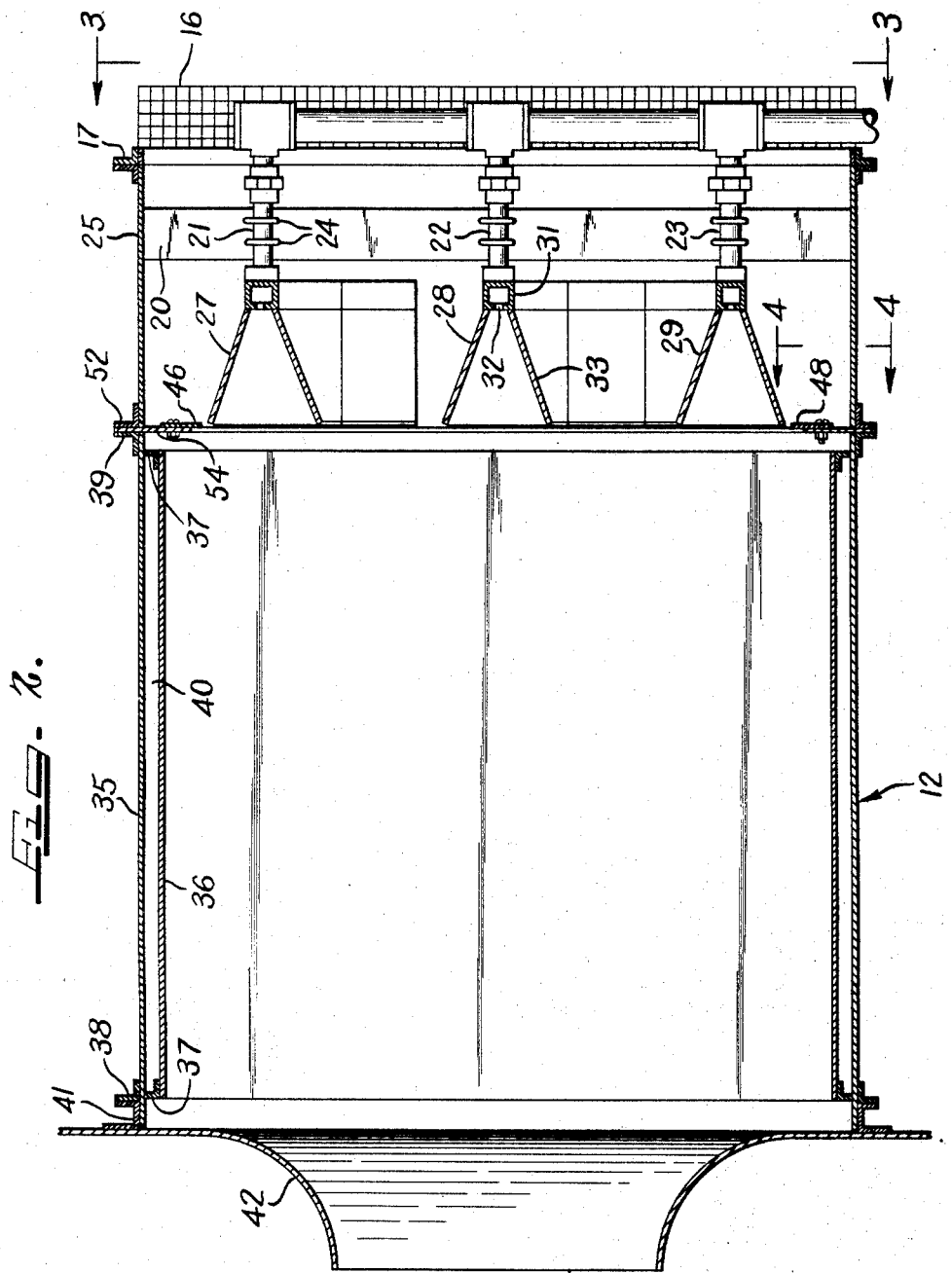
FIG. 2 is a side elevational view of the heating device of this invention on a larger scale than FIG. 1, taken along line 2—2 of FIG. 3.
Figure 3:
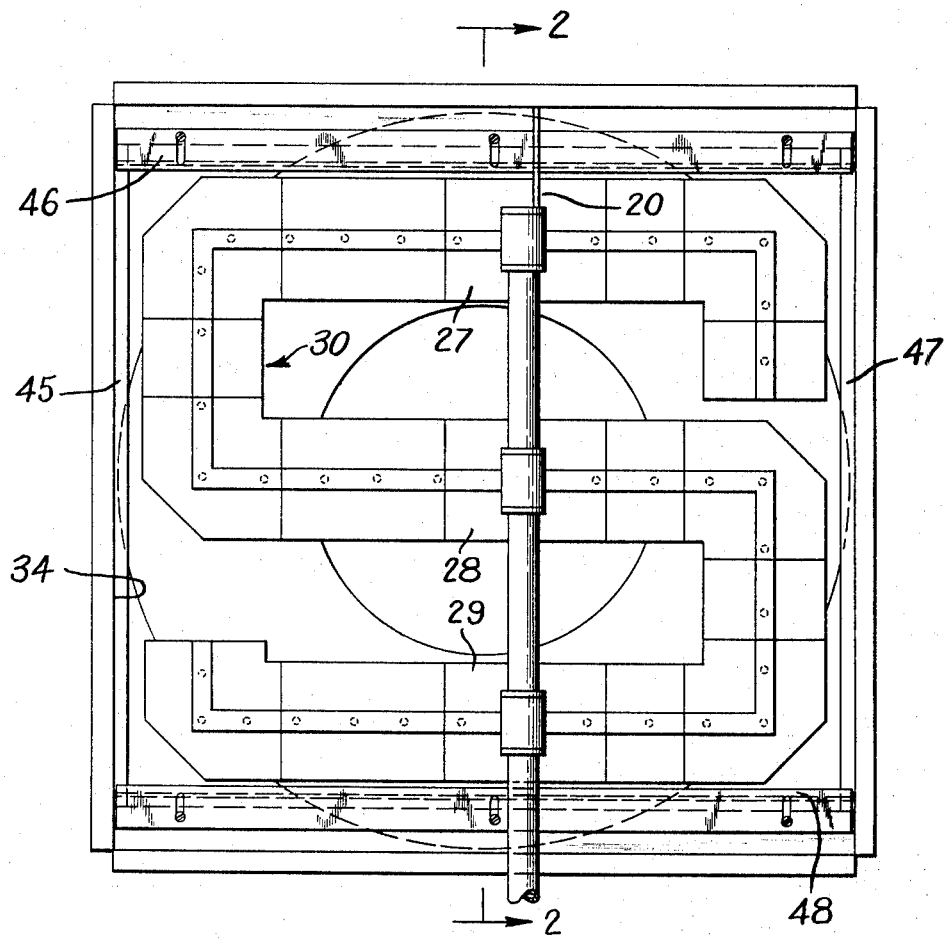
FIG. 3 is an end elevational view of the heating device of FIG. 2, looking in the direction of the arrows 3—3 of FIG. 2 and with the screen removed.

The burner section is shown in FIGS. 2 and 3. It is comprised of a vertical gas manifold 18 connected through appropriate controls 19 to a source of fuel gas (not shown). Manifold 18 supplies fuel gas to three horizontal conduits 21, 22 and 23, each of which is secured by U-bolts 24 to a vertically disposed heavy plate 20 welded at its top and bottom to a housing 25 for the burner section. Each conduit is connected to a burner section 27, 28 and 29, respectively, each of which is connected to adjacent burner sections in a manner to form a continuous burner 30 in the form of an S having a substantially square envelope.

Each burner section is comprised of a tubular gas conducting part 31 having openings 32 conducting the gas to a flared retort portion 33. The burner sections are made of fire-resistant metal, or the like, and are perforated.

The interior of housing 25 of the burner section forms a square opening 34 in which the S shaped burner is disposed. The area of the opening occupied by the S shaped burner is the maximum permissible consistent with leaving sufficient space around the burner to admit the air required for complete combustion of the fuel gas. The continuous shape of the burner, i.e., the S shape rather than a square or other shape, promotes better ignition of the gas by a pilot light disposed at one end or the other of the burner.

The fuel gas and air are mixed and burned in the furnace section 12. This section is comprised of an outer shell 35 of substantially square section, and an inner shell 36 supported from the outer shell by short pieces of angle iron 37 welded to the exterior of the inner shell 36 and then welded to the outer shell 35. The space between shells 35 and 36 is left open to provide an air space for cooling the outer shell. Angle iron frames 38, 39 are welded to the exterior and regions of the outer shell to provide stiffening for the shell and a means by which the furnace section 12 may be secured to the burner portion 10 and the blower 13. Inner shell 36 is shorter than outer shell 35 to allow circulation of air through the space 40 between the shells.

Angle iron frame 38 is bolted to a U-shaped attaching flange 41 on the belled inlet 42 to the blower 13. Belled inlet 42 terminates in a circular opening 43 which is symmetrically disposed with respect to the square interior of inner shell 36. As shown in FIG. 1, the vaned rotor 44 is immediately adjacent opening 43 and hence it is desirable that the flame produced by the S burner 30 remain at least eighteen inches away from opening 43 to avoid burning out the lubricant in the bearings for the vaned rotor 44 and otherwise damaging the rotor itself.

As stated above, the length of the flame in furnace section 12 depends upon the velocity of the air moving past the S burner; the greater the velocity the shorter the flame. Since the pressure at the opening 43 varies in accordance with the pressure in dryer 15, and the pressure in dryer 15 varies with the compaction of the grain being dried, means are provided for changing the velocity of the intake air passing through burner portion 10.

Figure 4:
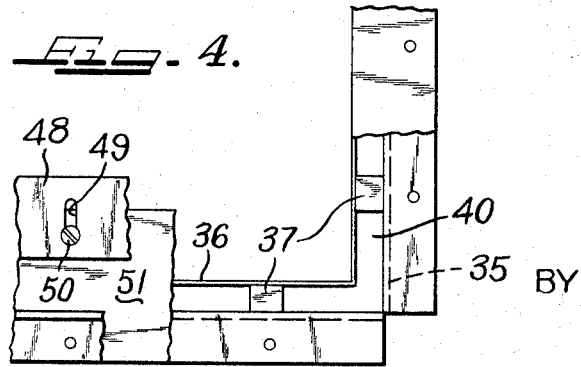
FIG. 4 is a fragmentary enlarged end elevational view of the air velocity control device used between the burner and the mixing chamber of the heating device.

The air velocity past the S burner is changed by changing the cross-sectional area of the opening around the S burner 30. This is accomplished by interposing plates 45, 46, 47 and 48 (FIG. 3) in the opening to form a rectangular profile the area of which is smaller than the area of the opening. Furthermore, the upper and lower plates 46 and 48 are mounted in a manner to permit shifting them in the opening to increase or decrease its area. Thus, as shown in FIGS. 4 and 5, plate 48 has a series of vertical slots 49 therein through which pass machine screws 50 which also pass through appropriate openings in a plate 51 clamped between angle iron frame 39 on outer shell 35 and the adjacent angle iron frame 52 to which the housing 25 of the burner portion 10 is welded. A nut 53, when tightened, fixes the position of plate 48 on plate 51. A similar arrangement is provided (not shown) for shifting plate 46 relative to a plate 54 fixed between angle iron frames 39, 52.

Blower 13 draws the heated products of combustion and air through opening 43 and discharges them through a rectangular outlet opening 55 into the transition duct 14 from which they pass into the inlet opening 56 of the grain dryer. There the hot gases pass through perforations 57 in the inner wall 58 of the double-walled shell in which the grain moves downward in the manner described in the aforementioned Andersen patent, through the grain and then through perforations 59 in the outer wall 60. The wet grain is continuously fed into the double-wall shell at the top thereof by a screw conveyor and the dried grain is removed at the bottom thereof by a second screw conveyor, all as set forth in said Andersen patent.

Should the grain be usually wet and tend to compact in the dryer 15 so as to obstruct the passage of hot air and combustion products therethrough more than is normally the case, the pressure in the outlet side of blower 13 will increase, and the pressure in the inlet opening 43 to the blower will likewise increase, thereby reducing the pressure drop across the furnace section 12. This reduces the velocity of the gases passing through furnace section 12 and increases undesirably the length of the flame from S burner 30 as observed through screen 16. The burner is then shut off, screen 16 is removed and one or both of profile plates 46 or 48 is shifted to decrease the area of the profile opening and increase the velocity of the air moving into furnace section 12. An excessive velocity of the air which may tend to produce a "flame out" can be corrected by shifting plates 46 or 48, or both, to increase the profile opening and thus reduce the velocity of the air entering furnace section 12.

The controls for the burner may be located in a box 61 disposed on the side of the burner and may follow the principles set forth in the above-mentioned Andersen patent. Said controls contemplate periodically turning the burner and blower on and off, but when they are turned on, the amount of fuel burned and the speed of the blower remain substantially constant.

It is apparent that by using a radial type centrifugal blower disposed between furnace section 12 and dryer 15, the products of combustion are thoroughly mixed with the incoming air so that the gases entering dryer 15 are of uniform temperature. This allows the furnace section to be operated at a higher average temperature, i.e., to produce a greater number of B.t.u.'s per unit time without fear of scorching the grain, thus speeding up the drying process and in addition, gaining greater uniformity in the finished product.

I claim:
1. A chamber to be supplied with heated air and having inlet and outlet openings, said outlet opening being subjected to varying degrees of restriction, and means for supplying said chamber with heated air comprising a furnace chamber having inlet and outlet openings, a fuel burner at the furnace chamber inlet opening, a blower disposed outside of the furnace chamber and having its outlet connected to the inlet to the chamber to be supplied with heated air, and an inlet connected to the furnace chamber outlet, and means for changing the effective area of the inlet to the furnace chamber whereby to control the length of the flame of the burner.

2. The combination described in claim 1, characterized in that the inlet opening to the furnace chamber is substantially rectangular and the means for controlling the length of the flame of the burner comprises a plate extending across one of the sides of said rectangular inlet opening partially to cover said opening, and means for adjusting the position of said plate relative to said furnace chamber inlet opening to vary the degree of covering of said opening by said plate.

3. The combination described in claim 1, characterized in that the furnace chamber has a double wall to create an air space between the exterior of the furnace chamber and the products of combustion in the chamber, said air space communicating with the inlet and outlet to said furnace chamber.

4. The combination described in claim 1, characterized in that the fuel burner is a gas burner comprised of a plurality of sections arranged in the form of a letter S having a generally square envelope, the inlet opening to the furnace chamber being substantially square and of larger dimensions than said burner envelope, the means for changing the effective area of the inlet to the furnace chamber whereby to control the length of the flame of the burner comprising a plate extending across one of the sides of said rectangular inlet opening to the furnace chamber partially to cover said opening, and means for adjusting the position of said plate relative to said furnace chamber inlet opening.

5. The combination in claim 4, further characterized in that the blower is a centrigugal blower having a circular inlet opening, the outlet from the furnace chamber is substantially rectangular, and said furnace chamber has a double wall creating an air space between the products of combustion and the exterior of the furnace chamber, said air space being in communication with the inlet and outlet openings for the furnace chamber.

6. The combination described in claim 1, characterized in that said fuel burner and blower operate at substantially constant capacity, whereby the length of the flame of the burner increases as the restriction increases to the outlet opening for the chamber to be supplied with heated air.

References Cited
UNITED STATES PATENTS

| | | | |
|---|---|---|---|
| 1,386,672 | 8/1921 | Altsitzer et al. | 158—992 |
| 3,044,754 | 7/1962 | Skerkoske et al. | |
| 3,056,214 | 10/1962 | Andersen | 34—45 |

FREDERICK L. MATTESON, JR., *Primary Examiner.*

E. G. FAVORS, *Assistant Examiner.*

UNITED STATES PATENT OFFICE
CERTIFICATE OF CORRECTION

Patent No. 3,386,715                                      June 4, 1968

Erhard E. Alms

It is certified that error appears in the above identified patent and that said Letters Patent are hereby corrected as shown below:

Column 4, line 22, "usually" should read -- unusually --.

Signed and sealed this 2nd day of December 1969.

(SEAL)
Attest:

Edward M. Fletcher, Jr.                            WILLIAM E. SCHUYLER, JR.
Attesting Officer                                              Commissioner of Patents